(No Model.) 5 Sheets—Sheet 1.

F. H. RICHARDS.
COIN CONTROLLED WEIGHING AND DISPENSING APPARATUS.

No. 589,294. Patented Aug. 31, 1897.

Witnesses:
C. W. Smith
E. O. Whitney

Inventor:
F. H. Richards.

THE NORRIS PETERS CO., PHOTO-LITHO., WASHINGTON, D. C.

(No Model.) 5 Sheets—Sheet 3.

F. H. RICHARDS.
COIN CONTROLLED WEIGHING AND DISPENSING APPARATUS.

No. 589,294. Patented Aug. 31, 1897.

Witnesses:
C. W. Smith
E. C. Whitney

Inventor:
F. H. Richards

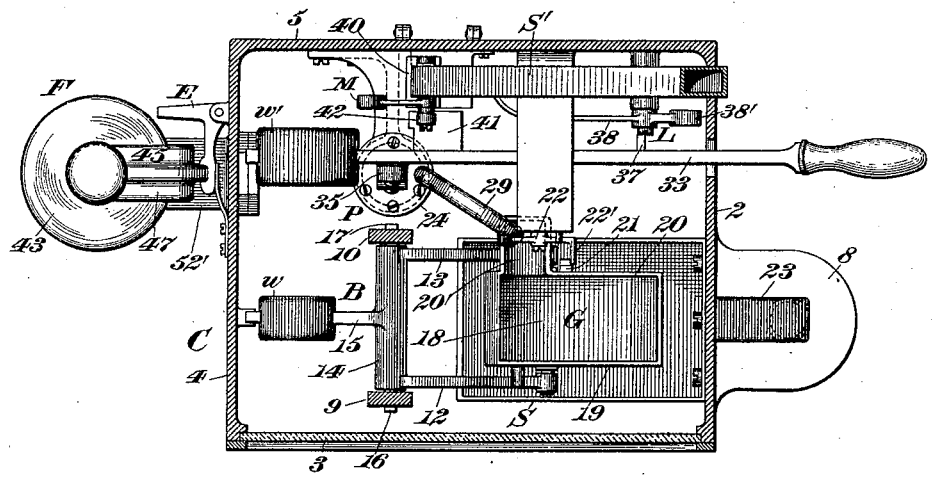

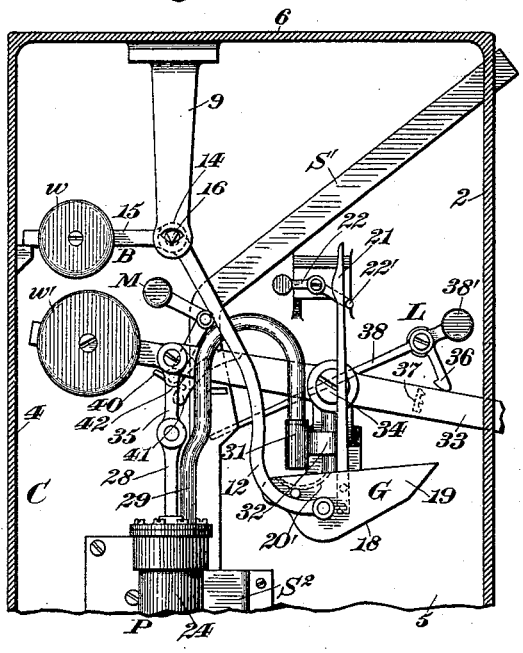

UNITED STATES PATENT OFFICE.

FRANCIS H. RICHARDS, OF HARTFORD, CONNECTICUT.

COIN-CONTROLLED WEIGHING AND DISPENSING APPARATUS.

SPECIFICATION forming part of Letters Patent No. 589,294, dated August 31, 1897.

Application filed April 17, 1897. Serial No. 632,570. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Coin-Controlled Weighing and Dispensing Apparatus, of which the following is a specification.

This invention relates to a coin-controlled weighing and dispensing apparatus.

The principal object of the invention is to furnish a simple, efficient, and easily-manipulated apparatus of the class specified comprehending novel coöperative mechanisms of such construction and organization that by the deposit of a proper coin in the coin-receiver and the reciprocation of the hand-lever of the apparatus a load of liquid of accurate predetermined weight will be delivered into a glass or other suitable receptacle, said apparatus being especially designed for the weight and delivery of simple quantities, such as ordinary drinks of liquid.

A further object of the invention is to provide an apparatus of the class specified comprehending weighing mechanism including a gravitative tilting load-receiver, a delivery-chute in operative relation with the load-receiver, a pump having an eduction-pipe whose discharge end is located in position to supply liquid to said load-receiver, means for supplying liquid to the pump, and coin-controlled instrumentalities for governing the intermittent operations of the pump and weighing mechanism.

Figure 1:
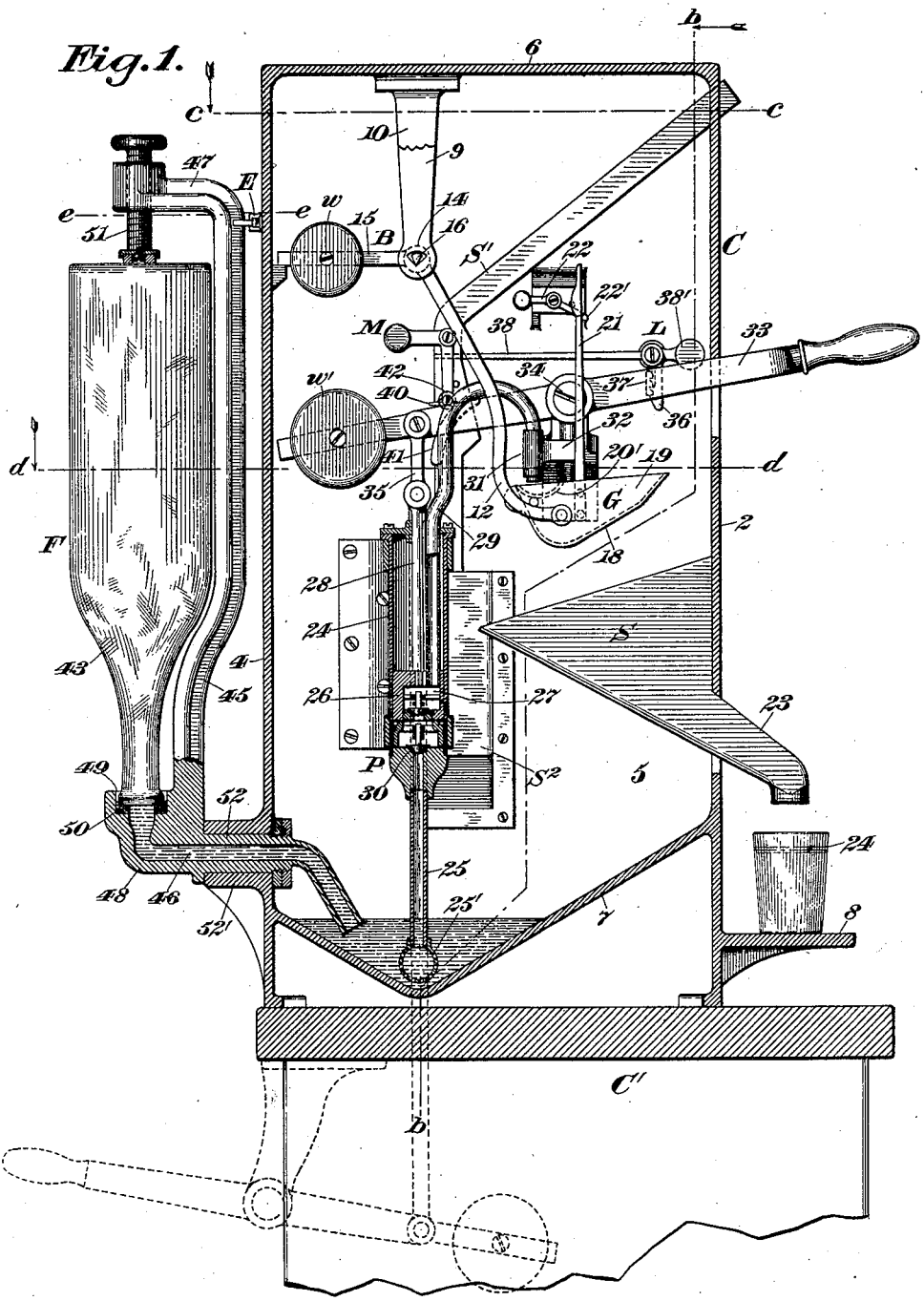
Figure 2:
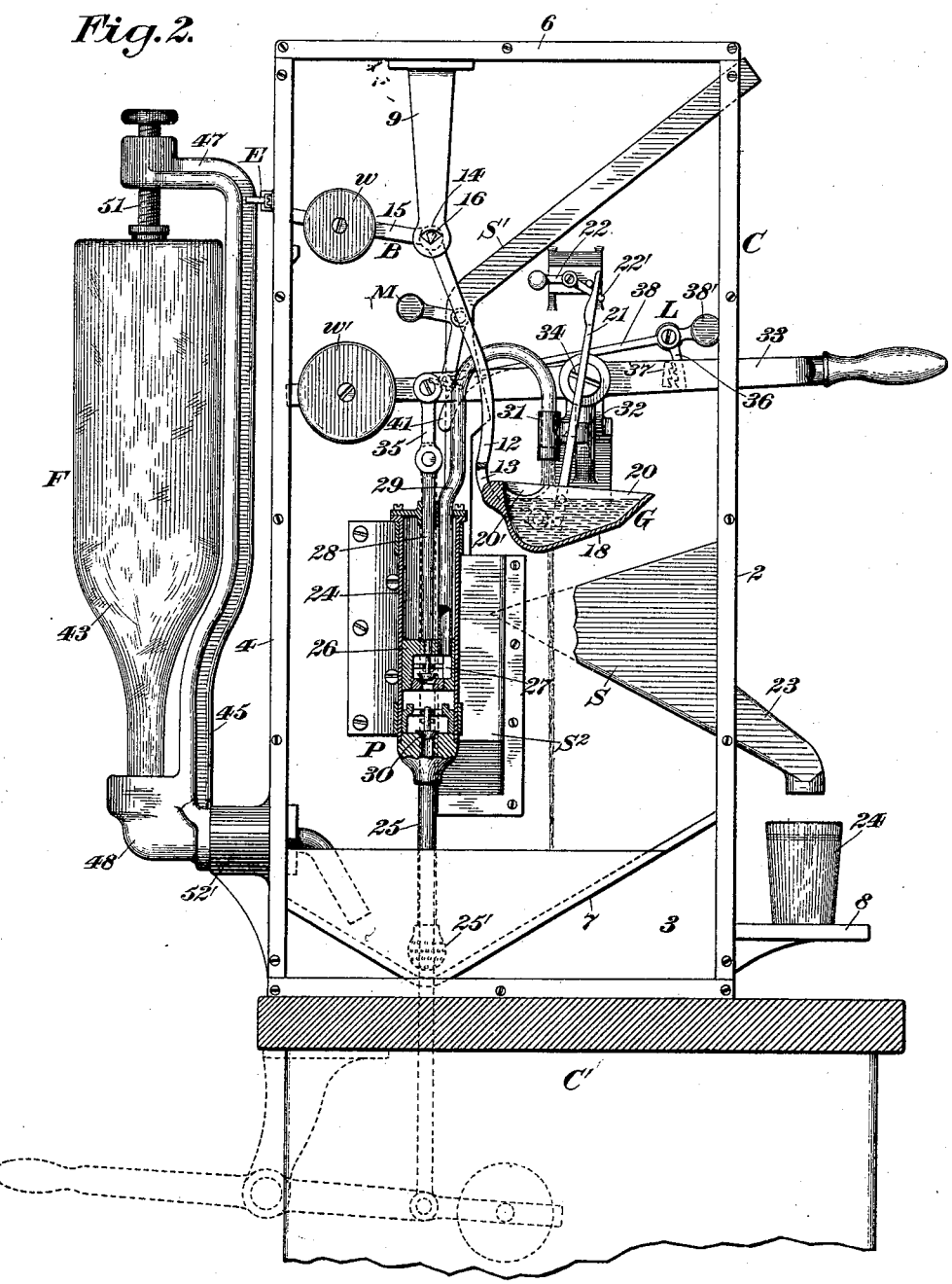
Figure 3:
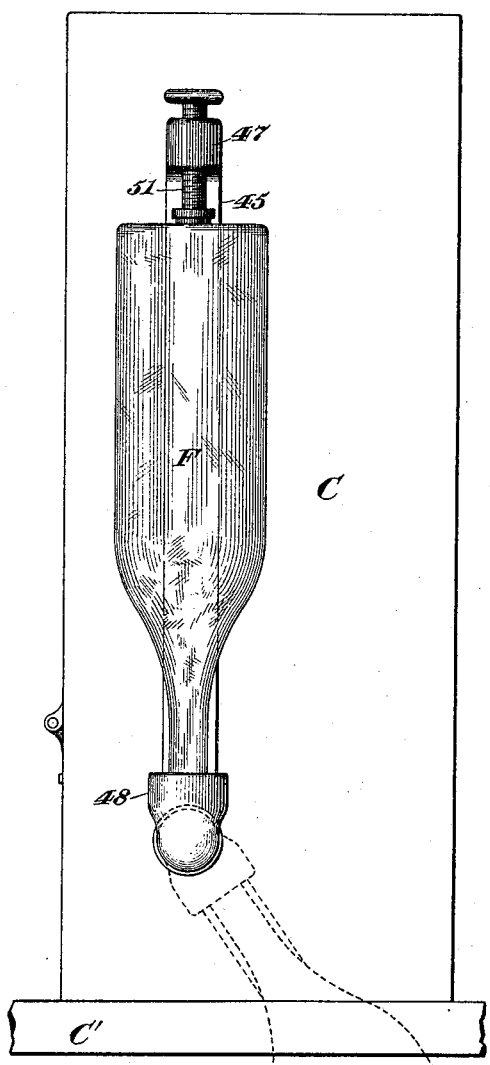
Figure 4:
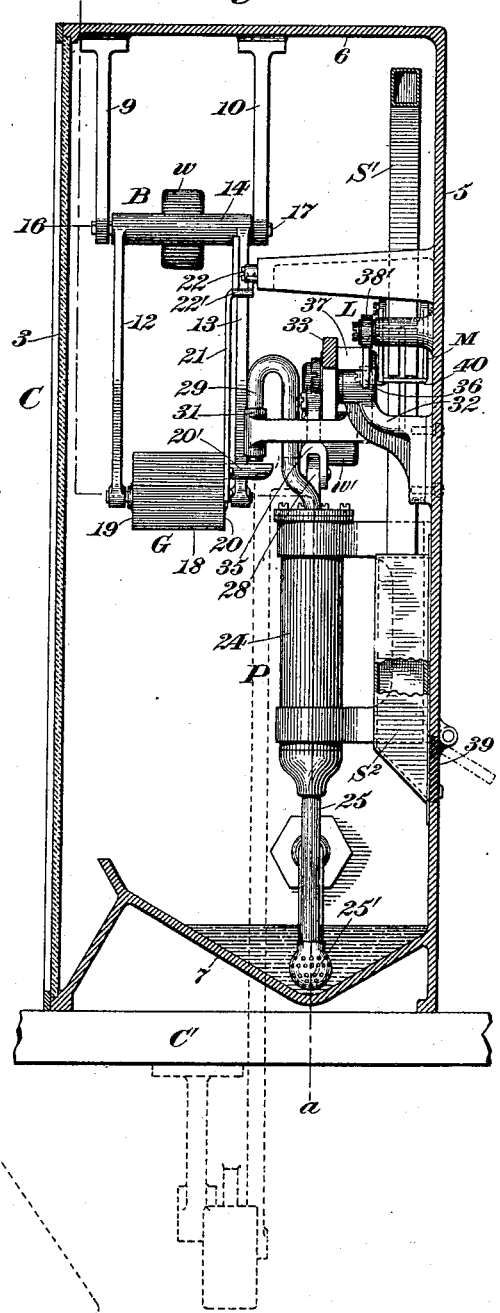

In the drawings accompanying and forming part of this specification, Figure 1 is a vertical section of the weighing and delivering apparatus, said section being taken on a line corresponding with the dotted line *a a*, Fig. 4, and showing the parts at the right of said line in their normal positions, the pump-actuating lever being locked against movement and the load-receiver being in its elevated load-receiving position. Fig. 2 is a side elevation, partially in section, of the apparatus, showing the parts thereof in the positions they occupy when the load-receiver of the weighing mechanism has its load nearly made up and showing the relative relations of said load-receiver and the discharge end of the eduction-pipe at this period in the weighing operation, a portion of the load-receiver and a portion of the delivery-chute being broken away, and the coin-actuated latch for locking the pump-actuating lever being shown in its lever-releasing position. Fig. 3 is a rear elevation of the apparatus, showing the shiftable bottle-holder and the bottle which supplies the reservoir in two positions, in full and dotted lines, respectively. Fig. 4 is a vertical cross-section of the apparatus, taken on a line corresponding with the dotted line *b b*, Fig. 1, and showing the parts at the left of said line. Fig. 5 is a horizontal cross-section of the apparatus, taken on a line corresponding with the dotted line *c c*, Fig. 1, and showing the parts below said line. Fig. 6 is a similar cross-sectional view taken on a line corresponding with the dotted line *d d*, Fig. 1. Fig. 7 is a vertical section similar to Fig. 1 of the upper portion of the apparatus, showing the parts in the positions they occupy after a coin has been deposited and the handle of the beam-actuated lever has been depressed to its lowest position. Fig. 8 is a similar sectional view showing the parts in the positions they occupy after the handle end of the pump-actuating lever has been shifted from the depressed position (shown in Fig. 7) to its fully-elevated position, the load-receiver being shown in its overpoised load-discharge position. Fig. 9 is a side view of the load-receiver, a portion of the scale-beam and the by-pass device which permits a discharge movement of the load-receiver. Fig. 10 is a horizontal section, on an enlarged scale, taken on a line corresponding to the dotted line *e e*, Fig. 1, and showing the spring-actuated catch for retaining the bottle-holder normally in its elevated position. Fig. 11 is a rear view of the parts shown in Fig. 10, drawn in projection with said figure. Fig. 12 is a plan view of the coin-actuated device which controls the operation of the pumping device and weighing mechanism; and Fig. 13 is a detail showing a portion of the coin-chute, the pump-actuating lever, and the device for blocking the lever-engaging movement of the coin-actuated latch intermittent each successive operation of the lever.

Similar characters designate like parts in all the figures of the drawings.

The weighing and delivering apparatus as a whole comprises, in the preferred form thereof shown in the drawings, a suitable casing for supporting the several operative parts; weighing mechanism, including an oscillatory beam and a gravitative tilting load-receiver supported thereon; a delivery chute or conduit located below and in position to receive the load from the load-receiver; supply apparatus, including a pump having an induction-pipe located with its discharge end above and in position to supply material to the load-receiver; a pump-actuator, and coin-controlled instrumentalities for facilitating a movement of the pump-actuator and thereby governing the operation of the weighing mechanism.

The casing of the apparatus, which may be of any suitable general construction and which is designated in a general way by C, is shown comprising the front and rear walls 2 and 4, the two side walls 3 and 5, the top wall 6, and the basin-shaped wall 7, all of which, with the exception of the side wall 3, will preferably be of metal and cast in one piece.

For the purpose of exposing the parts contained in the casing the side wall 3 will preferably be of transparent material, such as glass, and be secured to the ends of the front, rear, and top walls by securing-strips in the usual manner of securing glass plates to metal frames.

The walls of the casing will preferably have inturned flanges at their lower ends, forming a suitable supporting-base for said casing.

The front wall 2 of the casing C will preferably have formed integral therewith a bracket or shelf 8, on which a glass or other receptacle may be supported.

The bottom wall 7 of the casing, which is concaved and preferably of the shape of an inverted pyramid, constitutes a reservoir from which material is drawn to supply the load-receiver of the weighing mechanism, as hereinafter more fully described. This reservoir constitutes one of the elements of the supply apparatus.

The weighing mechanism of the apparatus comprises, in the preferred form thereof shown most clearly in Figs. 1, 2, 4, 7, and 8 of the drawings, a counterweighted oscillatory beam (designated in a general way by B) pivotally supported intermediate its ends between hangers 9 and 10, fixed to the upper wall 6 of the casing, and a gravitative tilting load-receiver G, carried on the non-counterweighted end of said scale-beam. This scale-beam, in the preferred form thereof shown in the drawings, comprises two depending receiver-supporting arms 12 and 13, respectively, joined together at their upper ends by a cross-bar 14 and an angularly-disposed counterweighted arm 15, furnished with a counterweight w. The cross-bar 14 is preferably furnished at opposite ends thereof with knife-edge pivots 16 and 17, respectively, which are supported on knife-edge bearings formed in the lower ends of the two hangers 9 and 10. The lower ends of the scale-beam arms 12 and 13 are bent outwardly at an angle to the longitudinal axis of the main portions of said arms to form load-receiver-supporting portions located somewhat in advance of the main portions of said arms 12 and 13.

The load-receiver G, which is shown somewhat similar in a general way to an ordinary scoop-shaped conveyer-bucket, is pivotally supported near the rear end thereof between the extreme lower ends of the scale-beam arms 12 and 13, and it consists of the concaved bottom wall 18, inclined upwardly at the forward end thereof in such manner as to form the deepest portion of the load-receiver at a point substantially in vertical alinement with the axis of movement thereof, the two side walls 19 and 20 and the concaved outwardly-extending flange or trough 20' forming part of the side wall 19 and communicating at the inner end thereof with the interior of the load-receiver.

As a means for preventing a load-discharging movement of the load-receiver G until the proper load has been made up therein and the same has arrived at its overpoised position I have provided, in operative relation with the load-receiver, intercepting means which in the preferred form thereof shown in the drawings comprises an upwardly-projecting arm or pointer 21, counterweighted at its upper end and fixed at its lower end to the load-receiver at a point slightly in advance of the axis of movement thereof, and a counterweighted self-setting by-pass 22, pivoted on a bracket constituting a part of the side wall 5 and having at the non-counterweighted end thereof a projection 22', which engages and prevents a forward movement of the upper end of the pointer and a discharge movement of the load-receiver until the proper load has been made up and the receiver and beam mechanism have arrived at a predetermined point in the descending or rearward oscillatory movements thereof. This by-pass is so constructed and so organized relatively to the pointer 21 as to permit a rearward movement of the upper end of said pointer during the return movement of the load-receiver to its normal load-receiving position, as will be readily understood by a comparison of Figs. 1, 2, 7, and 8 of the drawings. When the load-receiver is in its normal load-receiving position, as shown in Fig. 1, the by-pass-engaging arm or pointer 21 will be in substantially a perpendicular plane, with its counterweight in close proximity to a vertical line drawn imaginarily through the axis of tilting movement of the load-receiver, but as the load-receiver descends from the position shown in Fig. 1 to the successive positions shown in Figs. 2 and 8 the pointer 21 will gradually descend until released from the by-pass and will assume an oblique position relatively to a vertical line drawn through the axis of the receiver, the upper counterweighted end of such arm moving forward away from said line and gradually increasing the leverage exerted by said arm upon the load-receiver, and thereby materially accelerating the load-discharge movement of said receiver after the receiver has arrived at the position illustrated in Fig. 2, as will be readily understood by reference to Figs. 1, 2, and 8.

The delivery chute or conduit, which is designated in a general way by S, is shown having its open receiving end located inside the casing at a point below and in position to receive the load from the load-receiver, and is also shown having a spout 23 at the forward end thereof, which extends through the front wall 2 of the casing with its discharge end located above the shelf or bracket 8 and in position to discharge its contents into a glass or receptacle, such as shown at 24, supported on said shelf. This chute may be of any suitable construction and will be furnished with an inclined bottom for directing the flow of material.

The supply apparatus in the preferred form thereof illustrated in the drawings comprises in addition to the reservoir 7, located within and at the lower portion of the casing C, a force-pump (designated in a general way by P) and means for actuating said pump.

The pump P, which will preferably be in the nature of a piston-pump, comprises in the preferred form thereof shown in the drawings a vertically-disposed cylinder 24, fixed to one of the side walls of the casing and having a suction-pipe 25 at the lower end thereof which is furnished with a strainer 25', located below the normal liquid-line of the reservoir 7; a piston 26, working in said cylinder and having a valve-closed liquid-chamber 27 at the lower end thereof; a piston-rod 28, fixed to the piston and extending through a suitable bushing in the top wall or cap of the cylinder; an eduction-pipe 29, extending through the upper end of the cylinder and communicating with the liquid-chamber of the piston and having the discharge end thereof located in position to supply liquid to the spout of the load-receiver G when said load-receiver is in its normal elevated position, and an inlet-valve 30, normally closing the inner end of the suction-pipe 25. In the form of pump shown in the drawings the eduction-pipe is fixed at its lower end to and is movable with the piston 28, the outer discharge end of said pipe being shiftably supported in a bearing 31 on a bracket 32, fixed to the casing.

As a means for operating the pump P, I have provided a counterweighted pump actuator or lever 33, pivotally supported intermediate its ends, as at 34, on the bracket 32 and having its counterweighted end connected with the piston-rod of the pump by means of a link 35. The outer end or handle of said lever extends through a slot formed in the front wall of the casing, and the inner end of said lever is furnished with a weight $w'$, which normally retains the handle of the lever in the elevated position, as shown in Fig. 1.

It is desired to state in the above connection that any suitable form of pump may be employed in lieu of that illustrated in the drawings without departure from this invention. Therefore I do not desire to limit the invention to any particular construction and organization of pump mechanism.

As a means for normally locking the pump-actuator against movement in its elevated position I have provided in operative relation with said pump-actuator a latch (designated in a general way by L) having a locking arm or hook 36, normally engaging the catch 37 on said pump-actuator, as shown in full and dotted lines in Fig. 1. This latch is furnished with a counterweighted arm 38, the non-counterweighted end of which is shown extending into a coin-chute S' in position to be depressed by a coin passing through said chute, the counterweighted end 38' of said arm normally retaining the locking-arm of the latch in engagement with the catch of the pump-actuator.

The coin-chute S', which practically constitutes a part of the casing C, has its upper end preferably extended through the front wall of the casing in position to receive a coin and has its lower end in communication with a coin-receptacle $S^2$, accessible from the outside of the casing through a door 39. (See Fig. 4.) It will be understood, however, that any suitable means may be employed for tripping the latch L to release the pump-actuator.

As a means for preventing the premature relocking movement of the latch L and for holding said latch out of engagement with the catch of the pump-actuator after the arm 38 of said latch has been depressed by a coin deposited in the chute S', and until the pump-actuator has been depressed and elevated to operate the pump which supplies the load, I have provided, in connection with the coin-chute, a counterweighted stop device (designated in a general way by M) which in the preferred form thereof shown in the drawings comprises an angle-lever pivotally supported, intermediate its ends, on the coin-chute and having a stop-plate 40 normally intersecting the passage-way of the coin-chute, said plate being located normally in the path of movement of the free end of the counterweighted arm 38 of the latch L and being adapted to interrupt the actuator-releasing movement of the latch, said stop-plate holding the latch, after the arm 38 thereof has been depressed by a coin, in the position shown in Fig. 2 until the pump-actuator has been forced downward toward the position shown in Fig. 7. During the descending movement of the handle end of the pump-actuator the stop device M is shifted from the position shown in Fig. 1 to that shown in Fig. 7 by means of a cam or camfaced projection 41 on the side face of the counterweighted end of the lever, which cam bears against a roll 42 at the lower end of the stop device, said cam being so disposed that on the descending movement of the handle end of the pump-actuator the working face thereof will ride against the under face of the roll of the stop device M and shift said device backward with the stop-plate thereof out of engagement with the inner non-counterweighted end of the arm 38 of the latch L and permit a further releasing movement of the latch. After the stop device M is shifted out of engagement with the free end of the latch L by the cam 41 the weight of the coin will carry the inner end of the latch L downward far enough to permit the coin to pass off the end of said latch, whence it drops into the coin-receptacle, after which the counterweight of the latch will shift the same into its catch-engaging position. (See Figs. 1 and 8.)

As a convenient means for retaining a sufficient quantity of liquid in the reservoir 7 of the casing C to meet the requirement I have provided, in operative relation with this reservoir, a primary feed device, (designated in a general way by F,) which feed device comprises, in the preferred form thereof shown most clearly in Figs. 1, 2, and 3 of the drawings, a vessel or primary feeder 43, adapted for containing the liquid to be supplied to the reservoir 7, and a vessel-holder 45, having a feed-channel 46, which communicates at the inner end thereof with the reservoir 7 and at the outer end thereof with a discharge-opening of the vessel 43. This vessel-holder 45 is shown in the nature of an elongated bracket having outwardly-projecting arms or portions 47 and 48 at the upper and lower ends, respectively, thereof. The lower arm 48 has formed in the upper face thereof an annular depression 49, which communicates with the feed channel or conduit 46, said depression being preferably provided with a flexible gasket 50, on which the lower discharge end of the vessel or primary feeder 43 rests, said vessel being herein shown as a bottle and being clamped tightly against the gasket by means of a clamping device 51, which is shown in the nature of a screw, journaled in a screw-threaded bearing in the upper arm 47 of the holder or bracket 45.

As a means for shiftably supporting the holder or bracket 45 said bracket is shown having at the inner side thereof a tubular extension 52, which is journaled in a bearing 52', formed on the rear wall of the casing, the inner end of said extension being flexed so that the extreme end thereof will, when the main feed device is in the position shown in Fig. 1, extend below the normal fluid-line of the reservoir 7, as shown in said figure, this inward extension constituting the wall of the inner discharge end of the feed channel or conduit 46.

From the foregoing it will be seen that liquid may be supplied to the reservoir 7 from a bottle, and that when said bottle is emptied the bottle-holder 45 may be shifted from the position shown in full lines in Fig. 3 to that shown in dotted lines in said figure and the empty bottle removed and a full bottle be quickly substituted, after which said bottle may be inverted by shifting the holder to the position shown in full lines in said figure, allowing the contents to pass therefrom to the reservoir.

As a means for locking the vessel-holder 45 in the position shown in Fig. 1 I have provided a spring-actuated catch E, which engages a flange on the holder and prevents accidental movement thereof. The holder is shown held in place on the casing by means of nuts screwed upon the inner end of the tubular extension at the lower end of said holder, as shown most clearly in Fig. 1.

In the present instance the main feed device is shown locked on the outside of the casing and in place for convenient handling, but it will be obvious that the particular organization of said holder relative to the casing might be modified without departure from this invention.

In the drawings the apparatus is shown supported upon a counter, (designated in a general way by C',) the glass-supporting shelf being located at the front side thereof and the feed bottle or vessel being located in the rear of the casing and out of sight of any one standing in front of the counter.

In some instances it may be desirable to locate the pump-actuator under the counter and in position to be operated by a clerk behind the counter, and in Figs. 1 and 4 of the drawings I have shown, in dotted lines, such an arrangement of the pump-actuator, and if such an organization of pump-actuator is employed the coin-chute and coin-controlled device for locking the pump-actuator may be dispensed with and the apparatus used simply as a machine for weighing and dispensing loads of predetermined weight.

In the operation of the apparatus, assuming the parts to be in the positions shown in Fig. 1, a coin dropped into the coin-chute will release the latch L from engagement with the catch on the pump-actuator, after which the handle end of the pump-actuator may be depressed, which will impart a suction stroke to the piston and cause the same to draw up liquid into the piston-cylinder, whence it will be forced by the upward movement of the handle end of the lever and the resultant downstroke of said piston through the eduction-pipe of the pump into the spout of the load-receiver. After the load-receiver has been sufficiently filled as to overcome the resistance of the counterweight of the beam said load-receiver will have a downward and rearward movement, together with the lower end of the beam, in a path transverse to the direction of flow of the stream of liquid, changing the relation between the spout of said load-receiver and the discharge end of the eduction-pipe of the pump in such manner that when the load-receiver has arrived at its poising position only a portion of the liquid from said pipe will flow into the spout and the balance of said liquid will flow over the edge of the spout into the reservoir 7, the volume flowing into the spout from the eduction-pipe being gradually reduced by the backward movement of said load-receiver, as will be understood by a comparison of Figs. 1, 2, and 5 of the drawings. After a load has been completed in the load-receiver the upper end of the by-pass-engaging arm will be released from the by-pass, allowing said load-receiver to tip and discharge its load into the delivery-chute of the apparatus, the counterweighted end of the by-pass-engaging arm accelerating the load-discharge movement of the receiver.

For the purpose of securing accuracy in the making up of the load in the load-receiver it is advantageous to have the discharge end of the eduction-pipe of the pump so located with relation to the spout of the load-receiver that the volume of liquid supplied to said receiver will be gradually reduced during the gravitation of the load-receiver, this peculiar relation between the load-receiver and supply apparatus, as hereinbefore described, resulting in a coöperation between these elements, which is highly conducive to the perfect working of the apparatus, comprising an organization of the mechanism such as shown in the drawings, and enhances the value of the apparatus as an accurate weighing and dispensing instrumentality.

Having described my invention, I claim—

1. A coin-controlled weighing and dispensing apparatus comprising a casing having a supply-reservoir; weighing mechanism including a gravitative tiltable load-receiver located above said reservoir; a discharge-conduit in operative relation with the load-receiver; a coin-controlled supply apparatus, including a pump, for supplying material from the reservoir to the load-receiver and for governing the operation of the weighing mechanism, the constructions and organizations of the load-receiver, discharge-conduit, and supply apparatus being such that on the discharge of the load-receiver the same will be carried out of operative relation with the supply apparatus, and the surplus material will be directed past the receiver and discharge-conduit into the reservoir to be returned to the reservoir at the next operation of the pump.

2. A coin-controlled weighing and dispensing apparatus comprising a casing having a supply-reservoir in the lower portion thereof; a supply apparatus including a pump having an induction-pipe located in the reservoir and having an eduction-pipe located with its discharge end above said reservoir; a pump-actuator; a locking device for normally holding said pump-actuator against movement; coin-controlled instrumentalities for releasing said locking device; a discharge-conduit located between the reservoir and discharge end of the eduction-pipe of the pump; a gravitative tiltable load-receiver located between the discharge-conduit and eduction-pipe, the construction and organization of the load-receiver being such that on the filling thereof by the supply apparatus it will have a movement transversely of, and out of vertical alinement with, the discharge end of the eduction-pipe to thereby gradually reduce the amount of material supplied thereto and allow the surplus to fall back into the receiver to be carried back to the reservoir on the next operation of the pump.

3. In an apparatus of the class specified, a casing having a supply-reservoir; a feed vessel movably supported at one side of the casing and having a conduit communicating with the reservoir; a supply apparatus including a pump supported within the casing and having an induction-pipe whose discharge end is located below the water-line of the reservoir, and also having an eduction-pipe whose discharge end is located above said water-line; a counterweighted oscillatory scale-beam supported in the casing; a load-receiver pivotally supported on the scale-beam for movement transversely across the discharge-opening of the eduction-pipe to decrease the volume supplied to said receiver; a discharge-conduit located below the main portion of the receiver; an actuator for the pump; and coin-controlled instrumentalities for locking the actuator normally against movement and to thereby control the load-discharging movement of the receiver.

4. An apparatus of the class specified comprising weighing mechanism including a gravitative load-receiving discharger; a conduit in operative relation with said discharger; and coin-controlled instrumentalities, including a pump, in operative relation with the discharger and effective for supplying material thereto and for governing the operation of the weighing mechanism.

5. An apparatus of the class specified comprehending automatic weighing mechanism including an oscillatory scale-beam and a load-receiver pivotally supported on said scale-beam; a reservoir located below, and in position to catch the overflow from, the load-receiver; a supply apparatus including a feed-pump having an induction-pipe whose receiving end is located in the reservoir, and also having an eduction-pipe whose discharge end is located in position to supply material to the load-receiver when said receiver is in its normal load-receiving position, and to direct the surplus material to the reservoir when the load-receiver is in its load-discharging position; and coin-controlled instrumentalities for actuating the pump and for governing the operation of the weighing mechanism.

6. The combination, with a casing having a reservoir and with weighing mechanism including a counterweighted oscillatory scale-beam and a tiltable load-receiver supported on said scale-beam, of a discharge-conduit having its receiving end located between the load-receiver and reservoir in position to receive the contents of said load-receiver on the load-discharging movement thereof; a by-pass located above the load-receiver; a by-pass-engaging arm carried on said load-receiver and coöperating with the by-pass to prevent the tilting movement of the load-receiver until the scale-beam has arrived at a predetermined position, and embodying means for accelerating the load-discharging movement of the load-receiver on the release of said arm from the by-pass; a supply apparatus for supplying material to the load-receiver from the reservoir; and coin-controlled instrumentalities for governing the operation of the supply apparatus and weighing mechanism.

7. In an apparatus of the class specified, the combination, with a casing having a supply-reservoir and a discharge-conduit, of a piston-pump supported in said casing and having an induction-pipe extended into the reservoir and having an eduction-pipe located with its discharge end above said reservoir; a counterweighted hand-lever connected to the piston of the pump and having the handle thereof extended outside the casing; a coin-chute; a locking device normally engaging the hand-lever and having an arm extending into the coin-chute, whereby on the deposit of a coin the locking device will release and permit an operation of the hand-lever; and weighing mechanism including a gravitative tiltable load-receiver supported below the discharge end of the eduction-pipe of the piston-pump and constructed and operating to gradually reduce the volume of material supplied thereto during the gravitative movement of said receiver.

8. An apparatus of the class specified comprising weighing mechanism including a load-receiver; supply apparatus embodying a piston-pump having an eduction-pipe located with its discharge end above, and in position for supplying material to, the load-receiver; a counterweighted pump-actuating lever in operative connection with the piston of said pump; a coin-chute; a latch normally engaging and locking the pump-actuating lever against movement and having a latch-releasing arm in position to be actuated by a coin passing through said chute; and a discharge-conduit located below and in position to receive the load from the receiver.

9. The combination, with weighing mechanism including a gravitative tiltable load-receiver, of supply apparatus embodying a feed-pump having an eduction-pipe located with the discharge end thereof above and in position to supply material to the load-receiver; a pump-actuator having a handle extending through said casing; and a coin-controlled locking device for automatically locking the handle of the pump-actuator at the end of each ascending movement thereof, and said locking device having an arm in operative relation with a coin-chute and which arm is effective for releasing said locking device on the deposit of a coin.

10. A coin-controlled weighing and dispensing apparatus comprising a casing having a reservoir at the lower end thereof; weighing mechanism including a gravitative tiltable load-receiver located above the reservoir within said casing; a piston-pump supported within the casing and having an induction-pipe extended into the reservoir and an eduction-pipe located in position to discharge liquid into the load-receiver; a hand-lever pivotally supported on the casing and having one end thereof pivotally connected to the pump-piston and having the opposite end thereof extending through the casing; a locking device for normally holding the hand-lever against movement; and coin-controlled means for releasing said locking device to permit the operation of the hand-lever.

11. In combination, an angled scale-beam fulcrumed intermediate its ends at the angle and having a counterweight at one end thereof; a load-receiver pivotally supported for tilting movement on the non-counterweighted end of the scale-beam; a by-pass located above the load-receiver; and a vertically-disposed by-pass-engaging arm carried by the load-receiver and having a counterweighted end in normal engagement with the by-pass and adapted, at a predetermined point in the oscillatory movement of the scale-beam, for disengaging the by-pass and accelerating the tilting movement of the load-receiver.

12. The combination, with stream-supply means including an eduction-pipe, of weighing mechanism including a gravitative tilting load-receiver having a spout so disposed with relation to the discharge end of the eduction-pipe that on the gravitative movement of the load-receiver said spout will move transversely of the stream and gradually reduce the volume flowing into said spout.

13. The combination, with supply means including a pump having an eduction-pipe, of an oscillatory scale-beam; a gravitative tilting load-receiver pivotally supported on the scale-beam and having a communicating transversely-disposed material-receiving spout located below, and so disposed relatively to, the discharge end of the eduction-pipe that on the gravitative movement of the load-receiver said spout will be carried crosswise of the path of the stream to allow a gradually-increasing portion of the stream to flow over the edge of said spout and thereby gradually decrease the amount of material flowing into said spout.

14. The combination, with supply means including a pump having an eduction-pipe, of an oscillatory scale-beam; a gravitative tilting load-receiver pivotally supported on the scale-beam and having a transversely-disposed material-receiving spout located below, and so disposed relatively to, the discharge end of the eduction-pipe, that on the gravitative movement of the load-receiver said spout will be carried transversely across the path of the stream to allow a portion of the stream to flow over the edge of said spout and gradually decrease the amount of material flowing into said spout; and by-pass devices in operative relation with the load-receiver and effective for controlling the tilting movement thereof.

15. The combination, with a reservoir, of a feed apparatus comprising a pivotally-supported vessel-holder having a conduit coincident with the axis of movement thereof and in position to conduct material to the reservoir; and a vessel removably secured in said holder and having its discharge end in communication with the conduit.

16. In an apparatus of the class specified, the combination, with a casing having a reservoir, of a pivotally-supported bottle-holder having a conduit the discharge end of which is located in position to discharge liquid into the reservoir; a bottle removably supported on the holder, with the neck-opening thereof in communication with the conduit; a clamping device carried on the holder and adapted for holding the bottle; and means for retaining the holder normally in an elevated position.

17. In an apparatus of the class specified, the combination, with weighing mechanism including an oscillatory load-receiver, of a piston-pump having a suction-pipe at one end, and an eduction-pipe at the opposite end whose outlet is located above, and in position to supply material to, the load-receiver; means for actuating the piston of said pump; a reservoir for supplying liquid to the pump; a feed vessel shiftably supported at one side the reservoir; and a conduit communicating with the feed vessel and reservoir.

18. In an apparatus of the class specified, the combination, with a casing having a reservoir at the lower end thereof, of a piston-pump mounted in said casing and having at opposite ends thereof a suction-pipe and an eduction-pipe, respectively, the former of which extends into the reservoir; weighing mechanism including a gravitative tilting load-receiver supported below and in operative relation with the discharge end of the eduction-pipe; a counterweighted piston-actuator fulcrumed intermediate its ends and having the handle end thereof located outside the casing; coin-controlled devices for normally locking the piston-actuator against movement and effective, on the deposit of the coin, for releasing said actuator; a delivery-chute located below, and in position to receive the load from, the load-receiver and having a spout extending outside the casing; a shiftable bottle-holder having a conduit whose inner end is movable from a point above to a point below the liquid-level of the reservoir on the shifting movement of the holder; a bottle supported normally in an inverted position and having its throat in communication with the conduit; means carried by the holder for clamping said bottle in place; and means for normally locking the holder against movement.

FRANCIS H. RICHARDS.

Witnesses:
F. N. CHASE,
ANDREW FERGUSON.